United States Patent

[11] 3,563,388

[72] Inventor Southwick W. Briggs
       Chevy Chase, Md.
[21] Appl. No. 824,328
[22] Filed Feb. 3, 1969
[45] Patented Feb. 16, 1971
[73] Assignee William A. Brazerol
       Washington, D.C.
       fractional part interest to each

[54] RADIAL FLOW DISK FILTER
     5 Claims, 6 Drawing Figs.
[52] U.S. Cl. ................................................ 210/457,
                              210/484, 210/488, 210/498
[51] Int. Cl. .................................................. B01j 25/18
[50] Field of Search ....................................... 210/457,
          484, 488, 489, 490, 492, 497, 498; 55/278, 488,
                                                              489

[56] References Cited
          UNITED STATES PATENTS
2,354,380   7/1944   Kasten ......................... 210/488

| 2,553,820 | 5/1951 | Gunn............................ | 210/492 |
| 2,583,423 | 1/1952 | Hallinan....................... | 210/488X |
| 2,692,685 | 10/1954 | Garland....................... | 210/488 |
| 2,702,637 | 2/1955 | Shepard ....................... | 210/492 |
| 2,751,085 | 6/1956 | Bowers et al. .................. | 210/488 |
| 3,214,368 | 10/1965 | Muller........................... | 210/488X |

FOREIGN PATENTS

| 537,144 | 2/1957 | Canada ........................ | 210/488 |
| 569,626 | 1/1959 | Canada ........................ | 210/494 |
| 693,495 | 7/1953 | Great Britain................ | 210/493 |

Primary Examiner—Reuben Friedman
Assistant Examiner—C. M. Ditlow
Attorney—Stepno and Neilan ABSTRACT: A radial flow filter having fixed end caps, a stack of annular filter discs having their outer edges secured in fixed positions disposed between the end caps, said disks preferably having surface grooves, a pervious center tube, and a discharge outlet in one of said end caps.

Patented Feb. 16, 1971
3,563,388
2 Sheets-Sheet 1
FIG.1
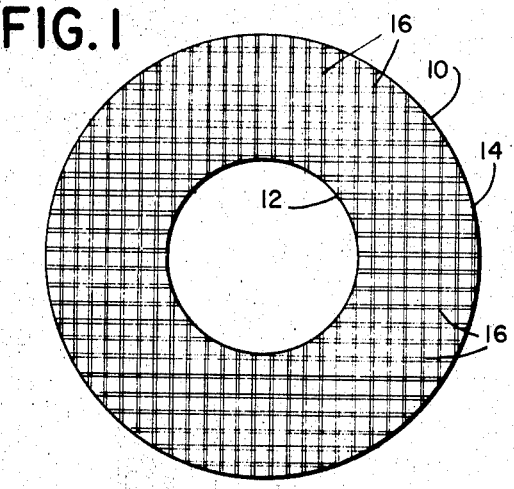
FIG.3
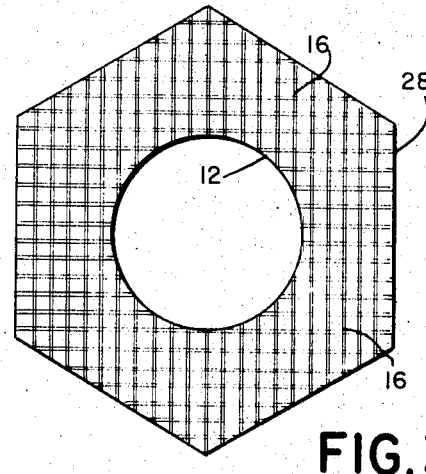
FIG.2
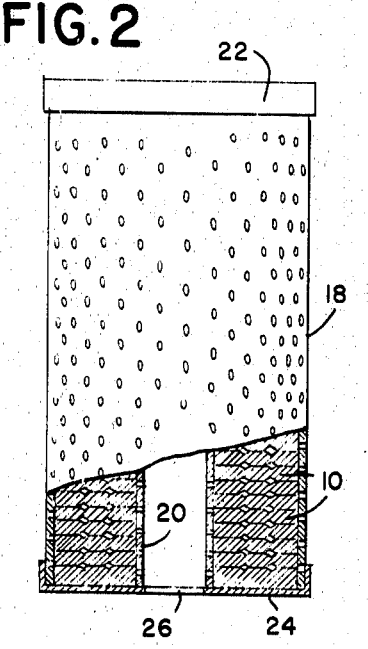
FIG.4
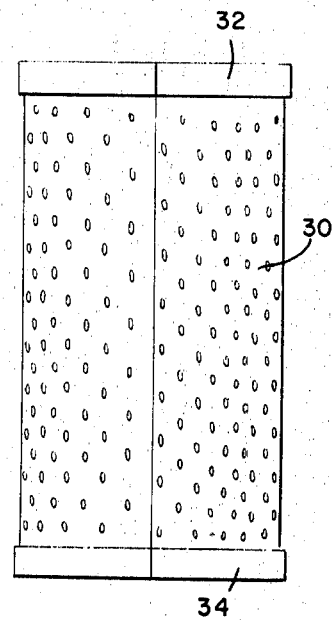
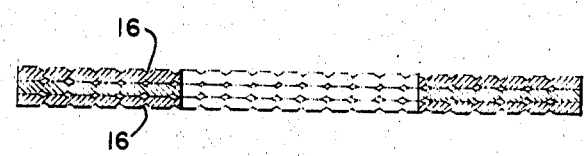
FIG.5
INVENTOR.
SOUTHWICK W. BRIGGS
BY
*Raymond W. Colten*
ATTORNEY

RADIAL FLOW DISK FILTER

The present application relates to a radial flow filter assembly comprising a stack of annular discs of a suitable filter medium with the outer edges of the discs being secured in fixed positions. The flow of oil or other fluid to be filtered is radially inwardly between the discs into an axial passage leading to a discharge outlet in one or both of the end caps.

It is an essential feature of the invention that the outer periphery of each of the annular discs is adhesively or otherwise fixed in position, for example, by being secured to an annular fluid permeable support member.

Although disc pack filters are known in the prior art, heretofore, the outer edges of the discs have not been secured, and the stack of discs was free to expand and contract. Usually, a takeup harness or other spring arrangement is employed in known disc pack filters to adjust the height of the disc pack. When oil flows through the disc pack, the fluid pressure expands the disc pack against the action of the harness, and when the fluid pressure ceases, the harness compresses the disc pack. However, with such prior art arrangements, it has been found that the fluid pressure frequently opens channels through the disc pack through which the oil flows without being filtered. Furthermore the prior art takeup harness or other spring means associated with one of the end plates of the disc pack, when the fluid pressure is removed, may compress the disc pack too much so that the flow paths between adjacent discs are closed, or the harness may fail to compress the disc pack to its original size. In the latter case, channels will eventually form through which liquid will flow without being filtered.

In contradistinction, the present invention employs annular discs which are secured at their outer peripheries to relatively rigid means so that the outer peripheries of the discs are fixed relative to each other.

It is a further feature of the invention that no take up harness or similar spring means is required to compensate for changes in the height of the stacked annular discs.

According to one aspect of the invention, the annular filter discs may be constructed to selectively remove particles of a particular size distribution, for example, relatively fine particles from the fluid being filtered.

Tests have shown that the filter assembly of the invention is superior in operating characteristics to a conventional prior art all pleated paper filter of the same outside dimensions as the filter of the invention.

On the basis of test data obtained during laboratory accelerated sludge addition tests, it has been concluded that, compared to a pleated paper filter, the filter assembly of the invention has substantially increased life and is more effective in removing particles from the fluid being filtered. Although the initial cost of the filter of the invention may be higher, this higher initial cost is more than compensated for by the increased life which leads to reduced maintenance costs, increased efficiency of filtration, and increased operating time before servicing is required.

It is a principal object of the present invention to provide a filter assembly having increased efficiency and/or longer life.

Another object of this invention is to provide a stacked annular disc filter in which the outer edges of the discs are held in fixed positions during operation.

Still another object of this invention is to provide a stacked annular disc filter in which a fluid pervious wrap or casing is adhesively bonded to the outer peripheries of the discs.

A further object of the invention is to provide a stacked annular disc filter which does not require a takeup harness or similar means to compensate for changes in height of the stack of annular discs.

The above and other objects, features and advantages of the invention will become more apparent as this description proceeds and from the accompanying drawings wherein:

FIG. 1 is a plan view of one embodiment of an annular filter disc element contemplated by the present invention.

FIG. 2 is an elevational view, partly in section, of a filter assembly employing filter discs of the type shown in FIG. 1.

FIG. 3 is a plan view of another embodiment of a filter disc in accordance with the invention, which disc has a hexagonal periphery.

FIG. 4 is an elevational view of a filter assembly employing filter discs of the type shown in FIG. 3.

FIG. 5 is a sectional view on an enlarged scale of a plurality of filter discs of the invention shown in stacked relationship.

Figure 6:
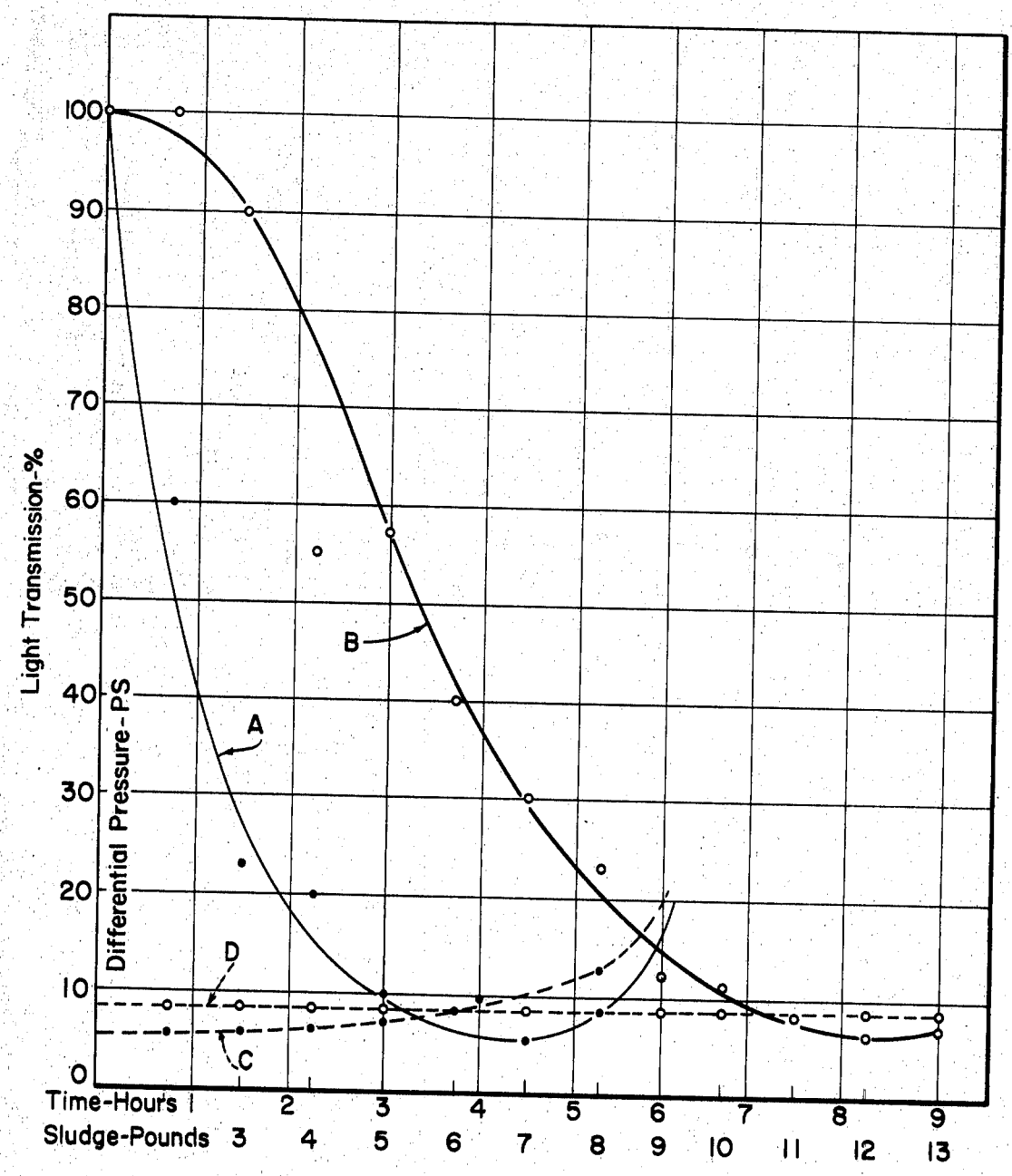
FIG. 6 is a graph comparing the operating effectiveness of a filter assembly of the invention with a pleated paper filter of corresponding size.

Referring now to the drawings, and more particularly to FIG. 1, reference numeral 10 designates an annular filter disc which has circular inner and outer peripheries 12 and 14, respectively. In this embodiment, both surfaces of the disc 10 are preferably cross embossed to provide therebetween a network of intersecting channels or grooves 16 so that when a plurality of the discs are arranged in stack relationship, excellent drainage will be afforded to fluid passing radially between adjacent discs.

The discs 10 may be made of any suitable fibrous material known in the art for use in such filters. Preferably, the discs are made of cotton paper of about 30 point which is lofted to about 35 point in the embossing process to form the grooves 16. On the other hand, if the discs are made of a so-called "open" material such as 160 pound basis weight 60 or 70 point linter paper, such a material has sufficient surface irregularities to entrap particles without embossing. While not wishing to be bound by any particular theory, it is theorized that the stacked discs 10 function to remove fine carbon particles and the like from the fluid being filtered by entrapping the particles throughout the full depth of the discs.

With reference to FIG. 2, a plurality of stacked discs 10 are surrounded by a fluid permeable outer wrap or casing 18 which is secured to the outer peripheries of the discs 10, preferably by an adhesive. A relatively rigid perforated center tube 20 constituting an axial passage to collect filtered fluid may be disposed within the inner peripheries 12 of the discs and extends between upper and lower end caps 22 and 24. The end caps are maintained in fixed relationship with respect to each other by the relatively rigid center tube 20 and/or by outer fluid permeable support member which may be a perforated cylindrical metal casing 10. As shown in FIG. 2, there is a discharge port 26 in the lower end cap 24 through which the filtered fluid leaves the filter assembly for further use.

The annular discs 10 may be secured to the perforated casing 18 in any suitable manner. By way of example, the annular discs may be stacked upon a mandrel and compressed slightly e.g. about ⅜ inch for a 35 point, 30 inch length filter. This assembly may then be inserted into the perforated casing 18 which may have an adhesive on its inner surface. The mandrel is thereafter removed, and if a center tube is to be employed, the perforated center tube 12, which is not adhesively secured to the discs, is inserted. Any suitable adhesive which will withstand the operating conditions may be employed. One suitable adhesive is a polyvinyl acetate—phenolic resin adhesive.

The casing 18 to which the outer peripheries 14 of the annular discs 10 are bonded is of sufficient rigidity to withstand the operating pressures while maintaining the preset spacing of the discs. If casing 18 is sufficiently rigid to space the end caps, no center tube is necessary. A relatively rigid wire mesh or screen may optionally be used in lieu of casing 18. Where a rigid center tube is employed, the outer support member may be a flexible mesh, the outer support member may be a plurality of taut strings or straps or any comparable means which may be adhesively bonded to the outer edges of the discs 10 to hold them in fixed position.

If desired, the filter discs 10 may be partially or completely impregnated with a phenol formaldehyde resin or other suitable thermosetting resin in order to provide increased rigidity and resistance to the materials to be filtered.

In order to further improve the filtering ability of the annular discs 10 and fluid distribution through the spacings between the discs, it is within the purview of the present invention to rotate each disc relative to the adjacent disc.

FIGS. 3 and 4 illustrate another embodiment of the invention in which annular discs 28 have a hexagonal outer periphery, a circular inner periphery 12, and intersecting grooves or channels 16 provided by cross embossing or similar means as described in connection with the FIG. 1 embodiment. The hexagonal outer configuration of the discs 28 enables the discs to be cut from large sheets or webs with the production of less scrap.

In FIG. 4, the discs 28 are incorporated within and fixedly secured to the inner surface of a fluid permeable outer wrap or casing 30 which has the form of a hexagon in plan to conform with the configuration of the discs 28.

It will of course be appreciated that a perforated center tube such as that of FIG. 2 may extend between the end caps 32 and 34 of the FIG. 4 embodiment, and that a discharge port is provided in one or both of the end caps 32 and 34. In this embodiment, the end caps are held in fixed position relative to each other by the perforated hexagonal casing 30 and/or by the center tube. In this embodiment, like in the embodiment described previously, no takeup harness or similar means is necessary.

FIG. 5 illustrates three stacked annular discs of the invention in vertical cross section to show in greater detail the grooves 16 which may be provided in both surfaces of the discs.

FIG. 6 is a graph comparing the operating characteristics of a filter in accordance with the FIG. 1 embodiment of this application with a pleated paper filter of corresponding size. The data used in preparing the graph was obtained from conducting accelerated sludge addition tests upon the filter of the invention and upon the pleated paper filter. The same quantity of oil and the same operating temperature were employed in both cases. The flow rate was 60 gallons of oil per minute, and 1 pound of sludge was initially present and an additional pound was added every 45 minutes. As a rule of thumb, 6 hours of the accelerated sludge addition test are equivalent to 1—2 months use in the field as an oil filter in a locomotive.

In FIG. 6, the percent light transmission through the oil and the differential pressure in pounds per square inch are plotted on the ordinate, and time in hours, and the amount of sludge added in pounds are plotted on the abscissa.

Curve A is a plot of the light transmission employing the pleated paper filter while curve B is a plot of the light transmission employing the filter of the invention. As is apparent from these curves, there is substantially more light transmission through the oil for the first 4½ hours of the test employing the filter of the invention. This means that the filter of the invention has removed more particles from the oil as evidenced by the higher light transmission. After about 4.5 hours, the light transmission employing the pleated paper filter has reached its lowest point and thereafter increases somewhat whereas it is approximately 8⅓ hours before cure curve B reaches its lowest point. The increase in light transmission after 4.5 hours for curve A and after about 8⅓ hours for curve B is believed due to the accumulated sludge on the filters being effective to filter out additional sludge.

Curves C and D are plots of the pressure differential across the filter with time employing the prior art filter and the filter of the present invention, respectively. As is clearly shown in FIG. 6, curve C rises sharply after about 4 hours which is an indication of a rapidly increasing pressure drop across the filter caused by clogging of the filter. It is clear that after about 6 hours, curve C has risen to a point where, if this was an actual operating installation, e.g. on a diesel locomotive engine design pressure drop may be about to be exceeded causing opening of a safety valve and reduced filtering of the oil, or shutdown of the engine. On the other hand, the pressure drop across the filter of the invention as indicated by the plot D remains substantially constant at about 8.5 p.s.i. even after 9 hours when the test was stopped. From this data it is apparent that the filter of the invention is not only more efficient in cleaning the oil but also has a substantially longer life as compared to the pleated paper filter.

While preferred embodiments of the invention have been shown and described with particularity, it will be appreciated that minor changes and modifications may suggest themselves to those of ordinary skill in the art upon being apprised of the present disclosure. It is intended to encompass all such changes and modifications as fall within the scope and spirit of the appended claims.

I claim:

1. A filter comprising a plurality of fluid pervious filter elements, each of said elements being comprised of a filter paper and having a pair of oppositely disposed side surfaces, said oppositely disposed surfaces being impressed with a grid pattern comprising a plurality of intersecting grooves, said elements having inner and outer peripheries, said elements being in compression and stacked one upon another with the land areas between said grooves in contact surface-to-surface; a fluid pervious outer wrap adhesively bonded to the outer peripheries of said elements to maintain the outer peripheries of the elements in fixed relationship with respect to each other and to maintain the elements in compression and control the depths of the grooves; a fluid pervious tube extending through said stacked elements and being in contact with the inner peripheries thereof; and an end cap on each end of said stack of elements, said end caps contacting said tube and outer wrap and respectively contacting the outwardly disposed surface of the filter element defining the adjacent ends of said stack, at least one of said end caps having a discharge port therein which communicates with the interior of said tube.

2. A filter comprising a plurality of fluid pervious filter elements, each of said elements being comprised of an annular disc of a filter paper and having a pair of oppositely disposed side surfaces, said elements being in compression and stacked one upon another, a fluid pervious cylindrical outer member bonded to the outer peripheries of said elements to maintain the outer peripheries of the elements in fixed relationship with respect to each other and to maintain the elements in compression, an axial passage through said elements for collecting filtered fluid, and an end cap on each end of said stack of elements, said end caps contacting said cylindrical outer member and respectively contacting the outwardly disposed surface of the filter element defining the adjacent ends of said stack, at least one of said end caps having a discharge port therein which communicates with said passage.

3. A filter according to claim 2, further comprising means to adhesively secure the outer periphery of each of said annular discs to said cylindrical outer member.

4. A filter according to claim 2, wherein said annular discs have unsecured inner peripheries.

5. A filter according to claim 2, wherein said annular discs are made of 60—70 point linter paper.